May 9, 1950 R. A. NEAL ET AL 2,506,611
FUEL CONTROL FOR AVIATION GAS TURBINE POWER PLANTS
Filed March 2, 1948
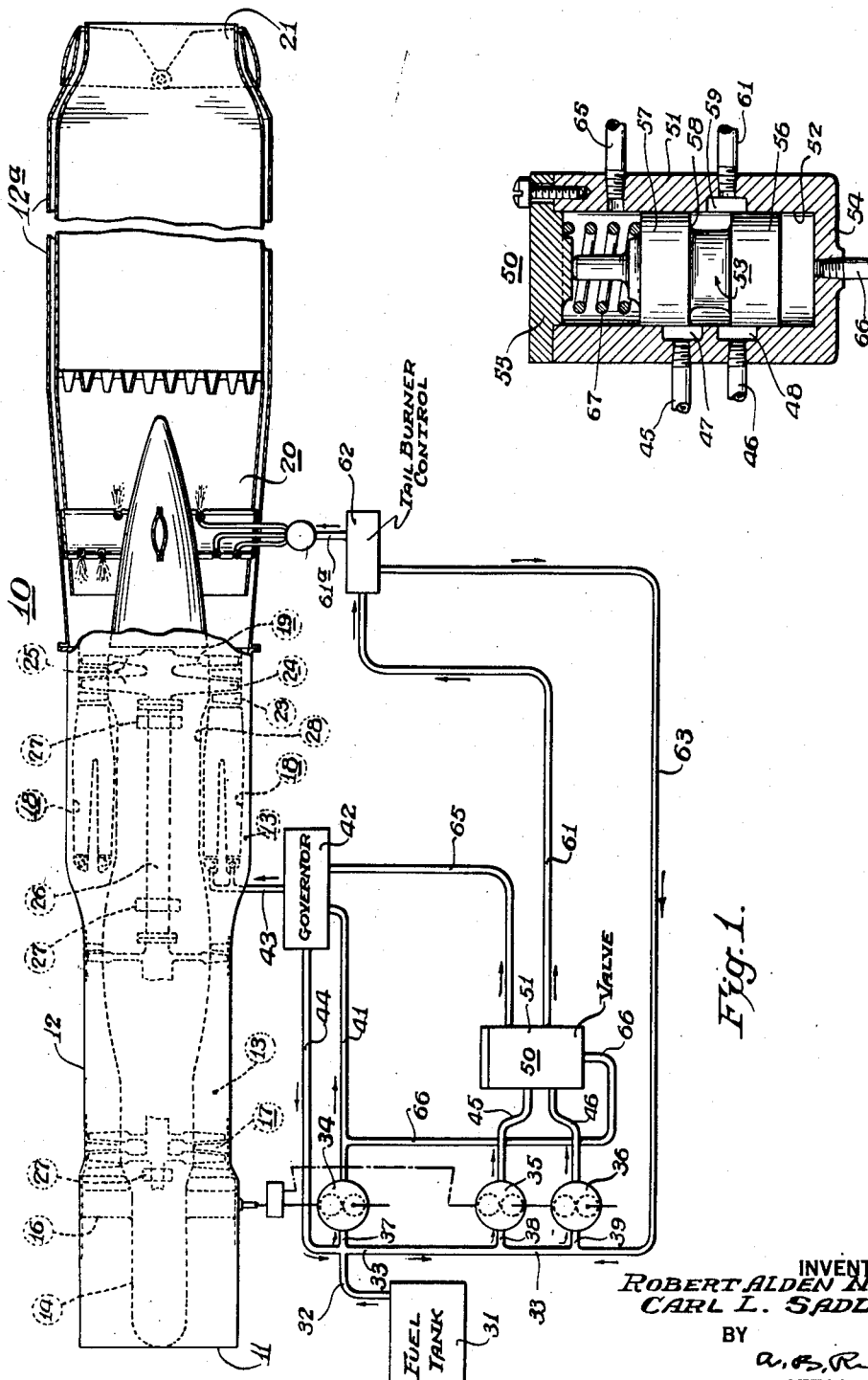
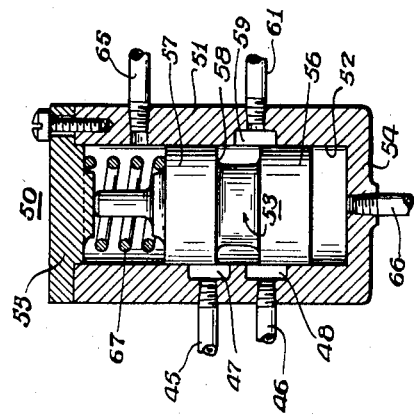
INVENTORS:—
ROBERT ALDEN NEAL
CARL L. SADLER, JR.
BY
ATTORNEY Patented May 9, 1950

2,506,611

UNITED STATES PATENT OFFICE 2,506,611

FUEL CONTROL FOR AVIATION GAS TURBINE POWER PLANTS

Robert Alden Neal, Media, Pa., and Carl L. Sadler, Jr., Rockford, Ill., assignors to Westinghouse Electric Corporation, East Pittsburgh, Pa., a corporation of Pennsylvania Application March 2, 1948, Serial No. 12,614

6 Claims. (Cl. 60—35.6)

This invention relates to combustion apparatus, more particularly to fuel supply systems therefor, and has for an object to provide improved apparatus of this character.

Some aviation jet propulsion power plants are equipped with auxiliary combustion apparatus, disposed downstream of the turbine which drives the compressor, and supplied with gases compressed by the compressor and heated by primary or main combustion apparatus disposed upstream thereof. Such auxiliary combustion apparatus may take the form of a tail burner or after burner and serves to increase the temperature of the exhaust gases prior to their discharge through the exhaust nozzle of the power plant in the form of a propulsion jet.

The present invention provides a fuel supply system in which a main fuel pump supplies fuel to the main combustion chamber only, and an auxiliary dual fuel pump normally supplies its entire output to the tail burner. The system includes an automatic control valve which functions upon failure of the main fuel pump to direct the output of one element of the dual auxiliary pump to the main burner so that it may continue to operate, the output of the other element of the dual auxiliary pump serving to maintain operation of the auxiliary or tail burner, although at a reduced rate.

Therefore, it is an object of the invention to provide separate fuel pumps for a pair of fuel-utilizing devices, together with means for dividing the output of one of said pumps between the pair of fuel-utilizing devices upon failure of the other pump.

Another object of the invention is to provide, in a fuel system for a pair of fuel-utilizing devices each having a separate fuel pump, a control valve for directing a portion of the output of one of the fuel pumps to the fuel-utilizing device normally supplied by the other fuel pump, upon failure of said other fuel pump.

These and other objects are effected by the invention as will be apparent from the following description and claims taken in connection with the accompanying drawing, forming a part of this application, in which:

Fig. 1 is a side elevational view, partially in section, of a gas turbine power plant incorporating the present invention, with the fuel system shown schematically; and Fig. 2 is an enlarged sectional view of the control valve of Fig. 1.

The present invention, although not limited thereto, is particularly adapted for use with a gas turbine power plant of the type employed on aircraft to drive the propeller or an electric generator, or to supply motive fluid for jet propulsion of the aircraft.

Such a plant preferably comprises a streamlined tubular casing having mounted axially therein a compressor adjacent the forward or inlet end, a turbine downstream thereof, and combustion apparatus located between the compressor and the turbine for heating the compressed air and which discharges the hot gases at suitable temperature and pressure to the turbine. The gases on leaving the turbine are discharged through a nozzle provided at the rear of the casing and may aid in propelling the aircraft.

Referring now to the drawing more in detail, the power plant shown in Fig. 1, and indicated in its entirety by the reference character 10, is adapted to be mounted in or on the fulselage or wing of an aircraft with the inlet 11 or left end, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial flow compressor 17, main combustion apparatus generally indicated 18, a turbine 19 which drives the compressor 17, an auxiliary combustion chamber 20, and a nozzle 21 defined by the rear end of the casing 12a.

Air enters at the inlet 11 and flows substantially straight through the plant, passing through the compressor 17, where its pressure is raised, and into the main combustion apparatus 18, where it is heated. The hot gases, comprising the products of combustion and excess air heated by the combustion, on leaving the main combustion apparatus are directed by suitable guide vanes or nozzles 23 against the blades 24 of the turbine discs 25, then are further heated in the auxiliary combustion chamber 20, and finally are discharged through the propulsion nozzle 21 to propel the aircraft.

By reference to Fig. 1 it will be noted that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the main combustion apparatus 18 is disposed.

The present invention is not limited to the specific details or arrangements of structure thus far described, but is primarily concerned with the fuel supply system for the main and auxiliary combustion chambers 18 and 20, respectively.

As shown diagrammatically in Fig. 1, the fuel supply system comprises a source of fuel in the form of a fuel tank 31 and a supply conduit 32—33 from which fuel is supplied to the main gear pump 34 and the dual auxiliary gear pumps 35 and 36 through the branch conduits 37, 38 and 39, respectively. The main pump 34 and the auxiliary dual pump 35—36 are driven separately from the turbo-compressor unit of the power plant, with the result that failure of either pump does not interrupt operation of the other.

The main pump 34 directs its output through conduit 41 of the governor 42, where the desired quantity of fuel is directed to the main combustion apparatus 18 through the conduit 43, excess fuel being by-passed to the inlet side of the pump through the return conduit 44.

The dual auxiliary pump 35—36 directs its output through conduits 45 and 46 to the inlet ports 47 and 48, respectively, of the control valve 50. This control valve 50 comprises a housing 51 having a cylindrical bore or chamber 52 for the valve member 53, the chamber being closed at one end by an integral wall 54 and at the opposite end by a cover 55.

The valve member 53 includes a pair of lands 56 and 57 separated by an annular groove 58, and is movable longitudinally in its chamber 52 between a normal position (shown in Fig. 2) where the valve groove 58 provides communication between the inlet ports 47 and 48 and an outlet port 59 which connects through conduit 61—61a with the auxiliary combustion chamber or tail burner 20, and an emergency position (with the valve member against the chamber end wall 54) where land 57 separates the flow of fuel from the inlet ports, with the fuel from port 48 flowing through conduit 61 to the auxiliary combustion chamber and the fuel from the port 47 passing through conduit 65 to the governor 42 and thence through conduit 43 to the main combustion chamber. The quantity of fuel admitted to the auxiliary combustion chamber is determined by control 62 which by-passes unwanted fuel through conduit 63 to the inlet side of the pumps.

A conduit 66 provides communication between the conduit 41, at the outlet side of the main fuel pump 34, and the interior of the valve chamber 52, below the valve member 53, thereby subjecting the latter space to the discharge pressure of pump 34. Under normal conditions of operation, this pressure on the lower end of the valve member 53 is sufficient to maintain the valve member in its normal raised position with the spring 67 above the valve member compressed. With the valve member in this normal position all of the output of the dual auxiliary pump 35—36 is directed to the auxiliary combustion chamber. Upon failure of the main pump 34, the pressure beneath the valve member 53 will be reduced and the spring 67 will move the valve member to its emergency position where it contacts the chamber end wall 54. With the valve member in this emergency position, the output of the dual auxiliary pump 35—36 is divided between the auxiliary combustion chamber 20 and the main combustion chamber 18, with the result that the latter is enabled to continue operation, although at a decreased rating.

While the invention has been shown in but one form, it will be obvious to those skilled in the art that it is not so limited, but is susceptible of various changes and modifications without departing from the spirit thereof.

What is claimed is:

1. In an aviation gas turbine power plant having an air compressor, a gas turbine for driving said compressor, combustion apparatus for heating air compressed by the compressor to serve as motive fluid for the turbine, and an after burner for heating gases exhausting from the turbine; first fuel-admission means for the combustion apparatus, second fuel-admission means for the after burner, a source of fuel, a main fuel pump for supplying fuel from said source to the first fuel-admission means, an auxiliary fuel pump for supplying fuel from said source to the second fuel-admission means, and means for diverting a portion of the output of said auxiliary fuel pump from said second fuel-admission means to said first fuel-admission means upon failure of the main fuel pump.

2. Structure as specified in claim 1, wherein said auxiliary fuel pump is of the dual type with both parts normally supplying the after burner, and the means for diverting a portion of the output of the auxiliary pump comprises valve structure including a housing defining a valve chamber having a pair of ports for admission of fuel thereto from the two parts of said dual pump and first and second outlet ports for discharge of fuel therefrom, a valve movable in said chamber between a normal first position where it directs fuel from both admission ports to said first outlet port for flow to the second fuel-admission means, and an emergency second position where it directs fuel from one of said admission ports to the first outlet port for flow to the second fuel-admission means and directs fuel from the other of said admission ports to the second outlet port for flow to the first fuel admission means.

3. Structure as specified in claim 2, including means responsive to normal operation of the main fuel pump for providing a first force for maintaining the valve in its normal first position, and means providing a second force on the valve in opposition to said first force for moving the valve from its normal first position to its emergency second position upon loss of said first force resulting from failure of the main fuel pump.

4. In a fuel system for an aviation gas turbine power plant of the type having a main combustion chamber upstream of the turbine, considered in the direction of flow of gases through the plant, and an auxiliary combustion chamber downstream of the turbine; a source of fuel, a main fuel pump for supplying fuel from said source to the main combustion chamber, an auxiliary fuel pump for supplying fuel from said source to the auxiliary combustion chamber, and control means operable automatically, upon failure of the main fuel pump, to direct to the main combustion chamber a portion of the fuel supplied by the auxiliary pump.

5. In a fuel system for an aviation power plant of the type having a main combustion chamber and an auxiliary combustion chamber; a source of fuel, a main fuel pump for supplying fuel from said source to the main combustion chamber at superatmospheric pressure, an auxiliary fuel pump for supplying fuel from said source to the auxiliary combustion chamber at superatmospheric pressure, and control means responsive to failure of the main fuel pump for by-passing to the main combustion chamber a portion of the fuel supplied by the auxiliary fuel pump.

6. Structure as specified in claim 5, wherein the control means comprises valve structure including a housing defining a valve chamber having a pair of supply ports for admission of fuel thereto from the auxiliary fuel pump, and first and second discharge ports for discharge of fuel thereupon, valve means movable in said chamber between a first position where it directs fuel from both supply ports to said first discharge port for flow to the auxiliary combustion chamber, and a second position where it directs fuel from one of said pair of fuel supply ports to said first discharge port for flow to the auxiliary combustion chamber and directs fuel from the other of said pair of fuel supply ports to the second discharge port for flow to the main combustion chamber.

ROBERT ALDEN NEAL.
CARL L. SADLER, Jr.

No references cited.